United States Patent [19]

Tucker

[11] 4,289,380
[45] Sep. 15, 1981

[54] LASER BEAM LINEAR ADJUSTABLE INTEGRATING MIRROR

[75] Inventor: Thomas R. Tucker, Alexandria, Va.

[73] Assignee: The United States of America as represented by the Secretary of the Navy, Washington, D.C.

[21] Appl. No.: 137,045

[22] Filed: Apr. 3, 1980

[51] Int. Cl.³ .............................................. G02B 5/08
[52] U.S. Cl. ..................................... 350/292; 350/310
[58] Field of Search ............... 350/292, 293, 295, 299, 350/310; 126/438; 219/121 LQ

[56] References Cited

U.S. PATENT DOCUMENTS

| | | | |
|---|---|---|---|
| 1,386,781 | 8/1921 | Harvey | 126/438 X |
| 2,471,954 | 5/1949 | Harvey | 126/438 X |
| 3,254,207 | 5/1966 | Lowell | 350/292 X |
| 3,704,683 | 12/1972 | Summersby | 350/299 UX |
| 4,038,971 | 8/1977 | Bezborodko | 350/292 X |
| 4,195,913 | 4/1980 | Dourte et al. | 350/292 |
| 4,202,605 | 5/1980 | Heinz | 350/310 X |

FOREIGN PATENT DOCUMENTS 121279 3/1948 Sweden .................. 350/292

Primary Examiner—F. L. Evans
Attorney, Agent, or Firm—R. S. Sciascia; William T. Ellis; Melvin L. Crane

[57] ABSTRACT

An adjustable linear integrating mirror for producing spatially uniform beam areas of high power lasers. The mirror is formed by a plurality of thin solid rectangular blocks made of a highly reflective metal with one thin face ground to a flat mirror finish. The blocks are assembled one upon the other with their mirror faces in alignment and held together at their ends by strips of spring steel. Wedge-shaped spacers are inserted between their free ends opposite the mirrored face to produce small angular rotations of each mirrored block. The spring steel should have sufficient tension to secure the wedges in place; however, if necessary, clamps may be used to hold the back ends together to secure the wedges in place. The angular setting of the mirrored blocks will determine the amount of overlay of the reflected laser beam. Fine tuning for a specific overlay may be performed by varying the depth of the wedges which varies the angular setting of each mirrored block section.

8 Claims, 4 Drawing Figures

LASER BEAM LINEAR ADJUSTABLE INTEGRATING MIRROR

BACKGROUND OF THE INVENTION

This invention relates to laser beam integrators and more particularly to a simple, mechanical, laser beam, linear, adjustable integrating mirror system. Since the advent of the laser, there has been a desire on the part of those in industry to form a uniform intensity laser beam for treating metals. Beam integrators currently exist which overlap in the vertical and horizontal directions. Such devices are made of square or rectangular flat reflective elements which are aligned for a particular crossover distance and with a particular average beam reflection angle. Such devices are complicated to form and are expensive because of the individual element alignment, etc.

Examples of prior-art beam integrators have been set forth in an article, "A Convex Beam Integrator", by Stanley L. Ream in *Laser Focus*, pages 68-70, November 1979. The article sets forth some of the problems with focusing mechanisms and their manufacturing difficulties.

SUMMARY OF THE INVENTION

The laser beam integrator is of simple construction and can be easily adjusted to compensate for different dispersions of the laser light beam. The device includes several stacked rectangular reflective surfaces which function to overlap the various parts of a single expanded beam area into one rectangle or square. The reflective surfaces are easily machined and polished to form a versatile structure which can be adjusted to provide on-axis, or off-axis, operation for a variety of crossover distances.

DETAILED DESCRIPTION

Figure 1:
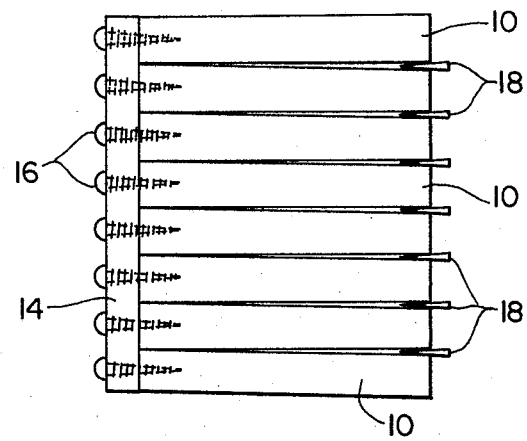
FIG. 1 is a side view of the assembly.
Figure 2:
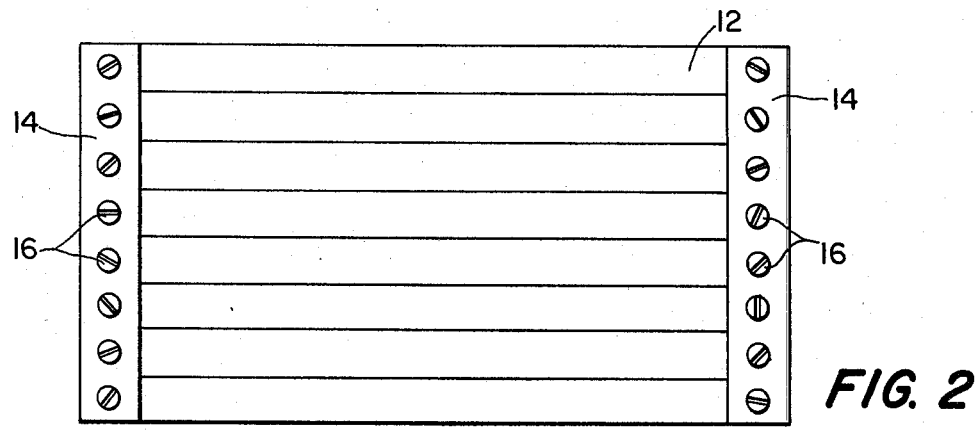
FIG. 2 is a front view of the assembly.
Figure 3:
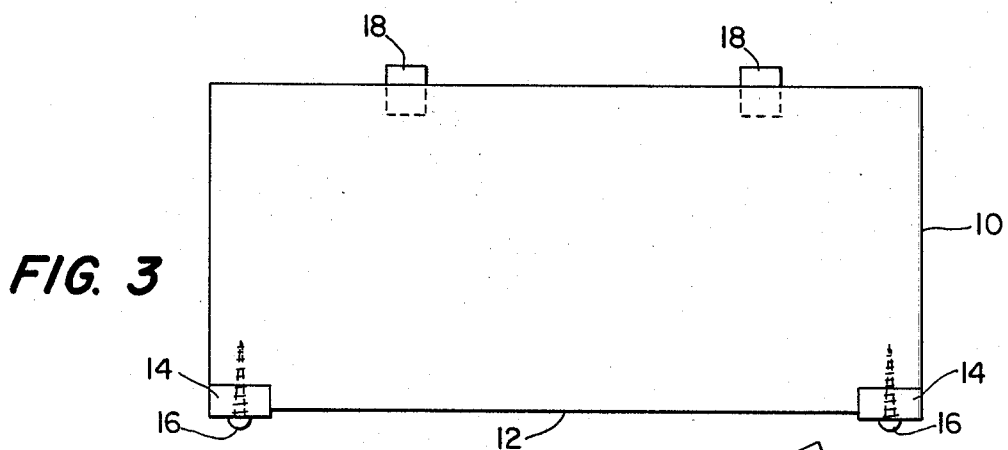
FIG. 3 is a top view of the assembly.

Now referring to the drawings, FIGS. 1-3 illustrate a plurality of identical rectangular solid blocks of material 10 each of which have a highly reflective front face 12. The rectangular blocks are held in place on their front faces by two parallel spring steel hinge straps 14 such that their front faces are closely adjacent to each other. The spring steel straps are secured to each of the rectangular blocks by threaded bolts or studs 16 which secure the rectangular blocks in plane. The front face of each rectangular block may be cut-out along the ends to receive the spring steel straps such that the faces of the spring steel straps are even with the front faces of the rectangular blocks.

Figure 4:
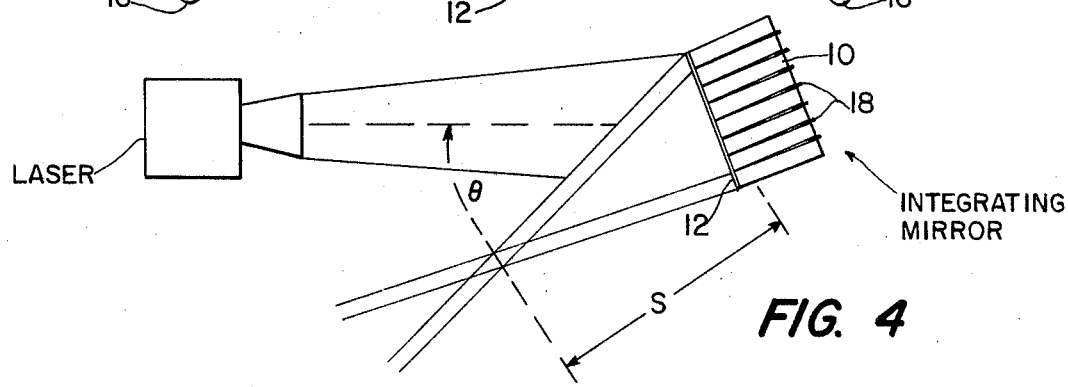
FIG. 4 illustrates the device in use.

The front face of each rectangular block is machined such that the front face is normal with the sides. The faces are ground and polished to a flat mirror finish. Since the blocks are rectangular, the blocks will be parallel with each other in their normal assembled positions. In this assembly, radiation incident on the faces of the rectangular blocks will be in parallel planes. In order to change the angle of the reflected radiation, spacers or shims 18 which may or may not be formed on an angle are used between the ends of the rectangular blocks. The ends of the spacers are placed between each of the rectangular blocks at the back thereof opposite the reflective faces. By inserting the spacers between the blocks, the blocks produce small angular rotations which cause the various incident beam segments to overlay at a distance from the mirrored faces of the blocks. The distance, S, of the overlap from the mirrored faces depends upon the distance that the spacers are forced between the back ends of the blocks, the average reflection angle and whether the incident radiation is converging, diverging or collimated as shown in FIG. 4. While constant shim thickness usually produces a usable overlap plane, fine tuning may be accomplished by varying the inserting distance, or depth, of each of the shims. Changing the shim thickness changes S for a given $\theta$ and incident beam divergence.

The spring tension of the assembly straps may be sufficient to secure the angular spacers in plane. However, side clamps may be used to clamp the blocks together thereby definitely securing the shim-spacers in place.

Since the rectangular blocks are made of metal and are of a certain length, heat generated by the laser beam will be carried off by the blocks. In the event heat is a problem, fluid could be piped through the blocks which will absorb some of the heat from the blocks to aid in cooling the blocks.

The rectangular blocks may be made of solid blocks of copper or molybdenum which can be polished to a highly reflective surface to form a front-face mirror surface.

The assembly as shown will reflect incident radiation to an overlapped beam which is as narrow as the thickness of one of the rectangular blocks and the length of the beam will be the same as the spread of the incident beam. The incident beam can be reflected to a square having side dimensions the same as the thickness of the rectangular blocks by placing one such integrator with its axis at right angles to the other. The radiation from one integrator is reflected to a narrow rectangular beam onto the second integrator at right angles thereto. The second integrator reflects the narrow beam to overlap at a distance away from the second integrator. The overlapped radiation will be in the form of a square with the dimensions of the square the same as the thickness of the rectangular blocks. By use of the two such integrators, all of the incident radiation can be concentrated to a small square.

The integrating mirror assembly has been described using identical rectangular blocks. It will be obvious that blocks of different thickness may be used; however the smallest dimension of the overlapped beam will be the dimension of the thickest rectangular block.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. An integrating mirror system for producing uniform intensity of reflected incident radiation at a target off-axis from the incident radiation which comprises:
   a plurality of rectangular block segments;
   each of said block segments having flat faces and including an edge defining a reflective front face;
   means for assembling said block segments in flat face stacked adjacency with their edge defined front faces in initial general planar alignment with each other defining a substantially continuous reflective surface; and means for changing the angle between adjacent block segments in said assembly in a uniform manner to cause an overlapping of reflected radiation at a spatial target distance.

2. An integrating mirror system as claimed in claim 1 wherein:

said block segments are made of copper or molybdenum.

3. The invention according to claim 1 wherein said means for assemblying the blocks segments in stacked adjacency comprises spring strap means securing the blocks together adjacent their front faces.

4. The invention according to claim 3 further defined by wedge means between the block segments removed from the spring strap means adapted for changing the angle between adjacent block segments and adjusting the reflective surfaces.

5. An integrating mirror for reflecting laser incident radiation for uniform intensity at a target which is off-axis from the incident radiating comprising:

a plurality of rectangular block segments;

each of the block segments having flat faces including an edge having a mirror finish defining a reflective front face;

said block segments stacked together with their reflective front faces aligned with each other for defining a continuous reflective surface;

means hingedly connecting adjacent block segments together adjacent their reflective front faces; and means for changing the angle between adjacent block segments;

whereby the reflective front faces are adjusted for causing overlapping of their reflected radiation at the target.

6. The invention according to claim 5 wherein the hinging means is a spring steel strap.

7. The invention according to claim 5 wherein the hinging means is a spring steel strap which also resiliently restrains the block segments stacked together.

8. The invention according to claims 5, 6 or 7 wherein wedge means are provided for changing the angle between adjacent block segments.

* * * * *